United States Patent
Comte et al.

(10) Patent No.: US 6,196,684 B1
(45) Date of Patent: Mar. 6, 2001

(54) HIGH REFRACTIVE INDEX GLASSES, MULTIFOCAL CORRECTIVE LENSES CONTAINING SAME

(75) Inventors: Marie M. J. Comte, Fontenay aux Roses; Paulo Marques, Sainte Genevieve des Bois, both of (FR)

(73) Assignee: Corning S.A., Avon Cedex (FR)

( * ) Notice: Subject to any disclaimer, the term of this patent is extended or adjusted under 35 U.S.C. 154(b) by 0 days.

(21) Appl. No.: 09/423,111

(22) PCT Filed: Apr. 27, 1998

(86) PCT No.: PCT/US98/08352

§ 371 Date: Jun. 2, 2000

§ 102(e) Date: Jun. 2, 2000

(87) PCT Pub. No.: WO98/49110

PCT Pub. Date: Nov. 5, 1998

Related U.S. Application Data
(60) Provisional application No. 60/051,538, filed on Jul. 2, 1997.

(30) Foreign Application Priority Data

Apr. 30, 1997 (FR) .................................................. 97 05357

(51) Int. Cl.$^7$ .............................. G02C 7/06; C03C 3/074; C03C 3/066; C03C 4/00
(52) U.S. Cl. .......................... 351/168; 351/172; 501/76; 501/79; 501/903
(58) Field of Search ..................................... 351/168, 172, 351/41, 159, 161; 501/74–79, 903

(56) References Cited

U.S. PATENT DOCUMENTS

| | | | |
|---|---|---|---|
| 3,915,723 | 10/1975 | Upton | 501/75 |
| 4,149,896 | 4/1979 | Faulstich et al. | 501/13 |
| 4,211,569 | 7/1980 | Hares et al. | 501/13 |
| 4,351,906 | 9/1982 | Boudot et al. | 501/74 |
| 4,507,393 | 3/1985 | Kassner et al. | 501/75 |
| 4,562,162 | 12/1985 | Sagara | 501/60 |
| 5,548,353 | 8/1996 | Kassner | 351/168 |

FOREIGN PATENT DOCUMENTS

| | | |
|---|---|---|
| 3002935 | 10/1980 | (DE) . |
| 2099417 | 12/1982 | (GB) . |
| 75-073914 | 6/1975 | (JP) . |
| 77-084211 | 7/1977 | (JP) . |
| 60-221338 | 11/1985 | (JP) . |

*Primary Examiner*—Georgia Epps
*Assistant Examiner*—Jordan M. Schwartz
(74) *Attorney, Agent, or Firm*—Milton M. Peterson

(57) ABSTRACT

The present invention relates to glasses of high refractive index having the following composition of oxides, expressed in percentages by weight:

| | |
|---|---|
| $SiO_2$ | 27–36 |
| $B_2O_3$ | 0–9 |
| $Li_2O$ | 1–5 |
| $Na_2O$ | 1–7 |
| $K_2O$ | 0–7 |
| CaO | 0–7 |
| BaO | 4–13 |
| ZnO | 0–8 |
| $La_2O_3$ | 4–15 |
| PbO | 4–27 |
| $TiO_2$ | 7–18 |
| $ZrO_2$ | 0–9 |
| $Nb_2O_5$ | 0–8 |
| with: | |
| $Li_2O + Na_2O + K_2O$ | 6–15 |
| $SiO_2 + TiO_2 + ZrO_2$ | 42–55 |
| $PbO + TiO_2 + ZrO_2 + Nb_2O_5$ | 29–40; | their use for the production of segments for multifocal corrective lenses; and multifocal corrective lenses incorporating at least one such segment in their structure.

8 Claims, No Drawings

HIGH REFRACTIVE INDEX GLASSES, MULTIFOCAL CORRECTIVE LENSES CONTAINING SAME

This application is a 371 of PCT/US98/08352 filed Apr. 27, 1998 which claims the benefit of U.S. Ser. No. 60/051,538 filed Jul. 2, 1997.

FIELD OF THE INVENTION

The present invention relates to high refractive index inorganic glasses; said index being more specifically between 1.70 and 1.78. Said glasses have particularly interesting uses as optical or ophthalmic glasses and are most particularly appropriate for manufacturing segments which enter into the making of multifocal corrective lenses. Said multifocal corrective lenses which incorporate at least one segment in a glass of the invention make up an integral part of the present invention.

BACKGROUND OF THE INVENTION

A multifocal lens is constituted of a principal lens in glass and of several segments in glass which are fused onto it. These segments have a higher refractive index than that of the principal lens; this enables obtaining areas of higher corrective power. Said segment(s) is (are) normally soldered onto the principal lens during a heat treatment bringing the whole of the glasses to a temperature close to the softening point of the glass constituting the principal lens. Consequently, the segment glasses must have characteristics of viscosity close to those of the glass of the principal lens. It must also have close thermal dilation characteristics, so that the resulting soldering has a very low strain level.

The objective of the present invention was to obtain glasses of refractive index between 1.70 and 1.78, fusible particularly to an ophthalmic glass manufactured by the Applicant Company (Corning S. A.), of index 1.6, of Abbe number 41 and which has the following physical characteristics:

thermal dilation coefficient: $100 \times 10^{-7}$ $K^{-1}$ (between 25 and 300° C.), softening point: 610° C., strain point: 460° C., annealing point: 490° C.

Said glass of the Applicant Company bears the Codename 8008. It was described in U.S. Pat. No. 4,540,672.

It has been determined that, in order to be fusible to said glass Code-named 8008, the glasses of the invention must have a thermal dilation coefficient between about 90 and $110 \times 10^{-7}$ $K^{-1}$ and a softening point between about 570 and 620° C.

The technical problem to be solved within the context of the present invention has therefore been that of providing glasses having the specifications below:

high refractive index: $1.70 \leq n \leq 1.78$;

thermal dilation coefficient: between 90 and $110 \times 10^{-7}$ $K^{-1}$ (between 25 and 300° C.);

softening point: between about 570 and 620° C.

PRIOR ART

According to the prior art, numerous glasses having a refractive index higher than 1.7 and which are able to be used as segment glass are already known. On the other hand, to the knowledge of the Applicant, there exists few of them which have the specifications indicated above; i.e. which combine a refractive index higher than 1.7 and properties of dilation and viscosity such as stated above or close to those stated above. Thus, the Applicant has picked out in said prior art:

U.S. Pat. No. 4,568,651 (HOYA) describing glasses having the following composition of oxides expressed in percentages by weight:

| | |
|---|---|
| $SiO_2$ | 14–24 |
| $B_2O_3$ | 6–14 |
| $Al_2O_3$ | 0–4 |
| $SiO_2 + B_2O_3 + Al_2O_3$ | 26–34 |
| MgO | 0–10 |
| CaO | 0–15 |
| BaO | 2–24 |
| SrO | 0–17 |
| ZnO | 0–12 |
| BaO + SrO + CaO + ZnO | 15–30 |
| PbO | 38–50 |
| $ZrO_2$ | 0–3. |

These glasses have an index between 1.74 and 1.78, a thermal dilation between 82 and $95 \times 10^{-7}$ $K^{-1}$, and a softening point between 560 and 640° C.

These properties are close to those which were sought after within the context of the invention. However, the composition of the glasses described in said U.S. patent is completely different from that of the glasses of the present invention. These prior art glasses have a very high PbO content and are devoid of alkalis and $TiO_2$;

the Japanese patent JP-A-61 146730 (NIPPON KOGAKU KK) describing glasses having the following composition of oxides, expressed in molar percentages:

| | |
|---|---|
| $SiO_2$ | 6–30 |
| $B_2O_3$ | 15–44 |
| $Li_2O$ | 7–18 |
| $Na_2O + K_2O$ | 0–3 |
| MgO + CaO + SrO + BaO + ZnO | 0–35 |
| $La_2O_3$ | 3–10 |
| $ZrO_2$ | 3–5 |
| $Nb_2O_5$ | 3–8. |

These glasses have an index of 1.7 to 1.78, a dilation of 98 to $114 \times 10^{-7}$ $K^{-1}$ and a softening point of 548 and 588° C. However, here again, the composition range is very different to that which is claimed here; these glasses contain neither $TiO_2$, nor PbO.

The U.S. Pat. No. 4,824,809 (SCHOTT) and the three Japanese patents JP-A-8 26765, JP-A-8 26766 and JP-A-8 25957 (NIKON CORP.) may also be mentioned which describe, respectively:

for the US patent, glasses having a refractive index of 1.73 to 1.78. The dilation and viscosity of said glasses are not specified. These glasses have contents in PbO and, in $TiO_2$ and in alkalis, respectively much higher and much lower than those of the glasses of the invention;

for the JP patents, glasses having refractive indices and softening points close to those of the glasses of the invention. The thermal dilation coefficients of said glasses are not specified. The composition ranges of said glasses are very different to that claimed here: the glasses in particular contain neither any PbO, nor any $TiO_2$.

In order to have the specifications such as stated above, the Applicant therefore proposes an entirely original solution (glass compositions).

SUMMARY OF THE INVENTION

The Applicant proposes novel glasses having the following composition of oxides, expressed in percentages by weight:

| | |
|---|---|
| $SiO_2$ | 27–36 |
| $B_2O_3$ | 0–9 |
| $Li_2O$ | 1–5 |
| $Na_2O$ | 1–7 |
| $K_2O$ | 0–7 |
| CaO | 0–7 |
| BaO | 4–13 |
| ZnO | 0–8 |
| $La_2O_3$ | 4–15 |
| PbO | 4–27 |
| $TiO_2$ | 7–18 |
| $ZrO_2$ | 0–9 |
| $Nb_2O_5$ | 0–8 |
| with: | |
| $Li_2O + Na_2O + K_2O$ | 6–15 |
| $SiO_2 + TiO_2 + ZrO_2$ | 42–55 |
| $PbO + TiO_2 + ZrO_2 + Nb_2O_5$ | 29–40. |

The glasses of the invention are obtained essentially from oxides identified above, taken in the amount specified above. It is certainly not excluded that other oxides intervene (vide infra) but, in any case, said other oxides do not intervene in significant amounts (always $\leq 5\%$, generally $\leq 3\%$ by weight, even $\leq 1\%$ by weight) and do not have a significant influence upon the properties sought after. They only intervene for adjustments.

DESCRIPTION OF THE INVENTION

The principal constituents of the glasses of the invention are $SiO_2$, PbO, $TiO_2$ and $La_2O_3$. Said glasses also contain $Li_2O$, $Na_2O$ and BaO. As regards the optional components ($B_2O_3$, $K_2O$, CaO, ZnO, $ZrO_2$ and $Nb_2O_5$), it is specified here, to all useful ends, that the minimal intervening amount from which they exert a significant effect is generally in the order of 0.5%. Thus, the glasses of the invention cannot contain optional constituents or, if they do contain them, it is generally in a minimal amount of 0.5% (% by weight).

According to an advantageous variant of the first object of the invention, the glasses have the following composition of oxides expressed in percentages by weight:

| | |
|---|---|
| $SiO_2$ | 28–35 |
| $B_2O_3$ | 2–9 |
| $Li_2O$ | 2–5 |
| $Na_2O$ | 2–6 |
| $K_2O$ | 0–5 |
| BaO | 5–13 |
| ZnO | 0–7 |
| $La_2O_3$ | 4–14 |
| PbO | 10–27 |
| $TiO_2$ | 9–15 |
| $ZrO_2$ | 0–4 |
| (obviously with, as indicated above: | |
| $Li_2O + Na_2O + K_2O$ | 6–15 |
| $SiO_2 + TiO_2 + ZrO_2$ | 42–55 |
| $PbO + TiO_2 + ZrO_2$ | 29–40 |
| (no $Nb_2O_5$)) | |

The high indices of the glasses of the invention are obtained by maintaining the sum of the $TiO_2$, PbO, $ZrO_2$ and $Nb_2O_5$ contents between 29 and 40%. The elements used preferably for obtaining this index are $TiO_2$ and PbO. This is why the minimal content of these elements must be 7 and 4% respectively. $ZrO_2$, in addition to its role upon the index, enables improving the chemical durability. The high cost of the starting materials which are sources of $Nb_2O_5$ renders this oxide less interesting than the previous ones. Too high a $TiO_2$, $ZrO_2$ or $Nb_2O_5$ content causes a devitrification at low viscosity, while too high a PbO content is unfavorable for the density and the dispersion.

$SiO_2$, $TiO_2$ and $ZrO_2$ are the elements which most increase the softening point. It has been observed that, in order to obtain a softening point in the range desired, the sum of the $SiO_2$, $TiO_2$ and $ZrO_2$ contents should be between 42 and 55%.

An $SiO_2$ content greater than 27% further allows guaranteeing a good chemical durability while beyond 36% it is difficult to obtain the desired index and dilation.

The alkali metal oxides in the proportions indicated above enable obtaining the dilation and the characteristics of viscosity sought after.

The alkaline-earth metal oxides as well as ZnO and $La_2O_3$ enable adjusting the index and the viscosity. In order to obtain the glasses having the highest liquidus viscosity, it has been observed that it was better to use BaO rather than CaO.

$B_2O_3$ has the advantage of decreasing the viscosity whilst having little influence upon the dilation.

In order to adjust the properties, as indicated above, other oxides such as $Al_2O_3$, MgO, SrO can also be added. Their total content must not go over 5%.

It is also possible to add conventional finishing agents such as $As_2O_3$ or $Sb_2O_3$, fluorides, bromides or chlorides with the proviso that their total content does not exceed 1%.

If desired, bleaching agents can be added. It is also possible to color the glass by adding conventional coloring elements, e.g. transition metal oxides or rare earth oxides.

In a way that facilitates the manufacture and the forming of the glasses of the invention, glasses having a low tendency to devitrify and in particular a high liquidus viscosity are sought after. The glasses described in the preferred range are optimized to this end. Their liquidus viscosity is greater than 3 Pa.s.

The manufacture of the glasses of the invention does not bring about any particular difficulty; it does not necessitate any unusual condition or measure. It is within the reach of the person skilled in the art.

The conventional starting materials, such as oxides, carbonates and nitrates, can be used for the preparation of the fillers to be melted. The usual precautions, as to the purity of said intervening starting materials, for obtaining optical glasses suffice (obviously if it is desired to obtain glasses of optical quality).

According to another of its objects, the present invention relates to the use of the glasses having the original compositions specified above for the production of segments, of high refractive index, of multifocal corrective lenses. In other words, another objective of the present invention is multifocal corrective lenses which comprise, in a manner known per se, a principal lens in a glass of relatively low refractive index and at least one segment soldered to said principal lens in a glass of higher refractive index; said segment(s) being characteristically in an original glass of the invention. Said multifocal corrective lenses of the invention generally comprise one sole segment of this type in their structure. The intervention of several of said segments is however in no way excluded.

As indicated in the introduction of the present text, the glasses of the invention have been most particularly developed to be fused with a glass (Code 8008) having the characteristics below:

thermal dilation coefficient: $100 \times 10^{-7}$ $K^{-1}$ (between 25 and 300° C.);

softening point: 610° C.;

refractive index: 1.6.

Thus the invention, within the context of its second objective, relates most particularly to multifocal corrective lenses whose principal lens is in said glass (having the characteristics above) and whose segment(s) is (are) in a glass of the invention.

The invention is illustrated in a totally non-limiting manner by Examples 1 to 10 below. Examples 1 to 4 belong to the preferred field.

According to an operating method specified below, glasses of the invention have been prepared whose compositions are given in the Table below. Said compositions are expressed in percentages by weight.

Operating Method

In each case, 2,500 g of starting materials were melted for one hour at 1,250° C. in a platinum crucible. The glass was then made into bars of one centimeter thickness.

The annealing was carried out with a cooling rate of 60° C./hour.

This operating method was carried out on the laboratory scale. It is well obvious that the glasses of the invention may be manufactured industrially by using conventional methods of melting and forming.

In said Table 1 below, the physical characteristics of the glasses obtained are specified.

The dilation coefficients were measured between 25 and 300° C. They are expressed in multiples of $10^{-7}$ $K^{-1}$.

The softening point or Littleton point is the temperature at which the viscosity of the glass is $10^{6.5}$ Pa.s. ($10^{7.5}$ poises).

| | |
|---|---|
| $SiO_2$ | 27–36 |
| $B_2O_3$ | 0–9 |
| $Li_2O$ | 1–5 |
| $Na_2O$ | 1–7 |
| $K_2O$ | 0–7 |
| CaO | 0–7 |
| BaO | 4–13 |
| ZnO | 0–8 |
| $La_2O_3$ | 4–15 |
| PbO | 4–27 |
| $TiO_2$ | 7–18 |
| $ZrO_2$ | 0–9 |
| $Nb_2O_5$ | 0–8 |
| with: | |
| $Li_2O + Na_2O + K_2O$ | 6–15 |
| $SiO_2 + TiO_2 + ZrO_2$ | 42–55 |
| $PbO + TiO_2 + ZrO_2 + Nb_2O_5$ | 29–40 |

2. Glasses according to claim 1 having the following composition of oxides, expressed in percentages by weight, that consists essentially of:

| | |
|---|---|
| $SiO_2$ | 28–35 |
| $B_2O_3$ | 2–9 |
| $Li_2O$ | 2–5 |
| $Na_2O$ | 2–6 |
| $K_2O$ | 0–5 |
| BaO | 5–13 |
| ZnO | 0–7 |
| $La_2O_3$ | 4–14 |
| PbO | 10–27 |
| $TiO_2$ | 9–15 |
| $ZrO_2$ | 0–4. |

TABLE 1

| | 1 | 2 | 3 | 4 | 5 | 6 | 7 | 8 | 9 | 10 |
|---|---|---|---|---|---|---|---|---|---|---|
| $SiO_2$ | 32.6 | 33.1 | 32.1 | 33.1 | 33.3 | 33.1 | 33.1 | 31.6 | 31.3 | 35.8 |
| $B_2O_3$ | 5.9 | 5.9 | 5.9 | 5.9 | 6.4 | 5.9 | 2.4 | 4.4 | 4.1 | 6.1 |
| $Li_2O$ | 4.0 | 4.0 | 4.0 | 4.0 | 4.0 | 4.0 | 4.0 | 4.0 | 4.0 | 3.9 |
| $Na_2O$ | 4.2 | 4.7 | 3.7 | 5.2 | 3.7 | 4.7 | 4.7 | 4.7 | 4.7 | 6.0 |
| $K_2O$ | | | | | | | | | | 4.1 |
| CaO | | | | | 5.6 | 5.6 | 5.6 | 4.1 | 5.6 | 4.6 |
| BaO | 11.9 | 6.3 | 11.9 | 11.4 | 6.3 | 6.3 | 6.3 | 7.8 | 6.3 | 5.2 |
| PbO | 21.1 | 18.1 | 24.1 | 18.1 | 18.1 | 18.1 | 18.1 | 18.1 | 18.1 | 5.0 |
| ZnO | | 5.6 | | | | | | | | |
| $ZrO_2$ | 2.9 | 2.9 | 2.9 | 2.9 | 2.9 | 2.9 | 2.9 | 6.9 | 2.9 | 2.5 |
| $TiO_2$ | 12.0 | 14.0 | 10.0 | 14.0 | 14.3 | 14.0 | 9.0 | 9.0 | 16.6 | 15.8 |
| $Nb_2O_5$ | | | | | | | | | | 6.5 |
| $La_2O_3$ | 5.1 | 5.1 | 5.1 | 5.1 | 5.1 | 5.1 | 13.6 | 9.1 | 6.1 | 4.2 |
| $As_2O_3$ | 0.3 | 0.3 | 0.3 | 0.3 | 0.3 | 0.3 | 0.3 | 0.3 | 0.3 | 0.3 |
| $Li_2O + Na_2O + K_2O$ | 8.2 | 8.7 | 7.7 | 9.2 | 7.7 | 8.7 | 8.7 | 8.7 | 8.7 | 14.0 |
| $SiO_2 + TiO_2 + ZrO_2$ | 47.5 | 50.0 | 45.0 | 50.0 | 50.5 | 50.0 | 45.0 | 47.5 | 50.8 | 54.1 |
| $PbO + TiO_2 + ZrO_2 + Nb_2O_5$ | 36.0 | 35.0 | 37.0 | 35.0 | 35.3 | 35.0 | 30.0 | 34.0 | 37.6 | 29.8 |
| Refractive Index | 1.740 | 1.742 | 1.737 | 1.739 | 1.744 | 1.740 | 1.735 | 1.737 | 1.768 | 1.710 |
| Dilation coefficient | 96 | 93 | 97 | 96 | 94 | 97 | 101 | 98 | 98 | 101 |
| Softening point | 582° C. | 579° C. | 574° C. | 588° C. | 606° C. | 600° C. | 604° C. | 602° C. | 602° C. | 606° C. |
| Devitrification | | | | | | | | | | |
| Liquidus | 910° C. | 950° C. | 910° C. | 950° C. | | 1000° C. | | | | |
| Liquidus Viscosity (Pa · s) | 7 | 3.5 | 7 | 3.5 | | 2.5 | | | | |

What is claimed is:

1. Glass having a refractive index in the range of 1.70–1.78 and having compositions expressed in percentages by weight on an oxide basis, that consist essentially of:

3. A glass segment for a multifocal corrective lens, the lens having a refractive index in the range of 1.70–1.78 and having a composition in accordance with claim 1.

4. A glass segment in accordance with claim 3 having a softening point of 570°–620° C. and a thermal dilation coefficient of 90–110×110$^{-7}$/° C.

5. A glass segment in accordance with claim 3 having a composition in accordance with claim 2.

6. A multifocal lens in accordance with claim 5 wherein the glass segment has a thermal dilation coefficient of 90–110×10$^{-7}$/° C. and a softening point of 570–620° C.

7. A multifocal corrective lens comprising a principal glass lens having a refractive index lower than the refractive index of a glass segment incorporated in the principal glass lens, the glass segment having a refractive index in the range of 1.70–1.78 and having a composition in accordance with claim 1.

8. A multifocal lens according to claim 7 characterized in that the glass of said principal lens has the following characteristics:

thermal dilation coefficient: 100×10$^{-7}$ K$^{-1}$ (between 25 and 300° C.);

softening point: 610° C.;

refractive index 1.6.

* * * * *